(12) United States Patent
Maupin et al.

(10) Patent No.: US 6,507,975 B2
(45) Date of Patent: Jan. 21, 2003

(54) RETRACTABLE CASTER

(76) Inventors: Michael Harrison Maupin, P.O. Box 759, Burleson, TX (US) 76097; Michael Shawn Maupin, P.O. Box 759, Burleson, TX (US) 76097; Kenneth Roy Hill, 3104 Bewley St., Haltom City, TX (US) 76117

( * ) Notice: Subject to any disclaimer, the term of this patent is extended or adjusted under 35 U.S.C. 154(b) by 0 days.

(21) Appl. No.: 09/852,932

(22) Filed: May 10, 2001

(65) Prior Publication Data

US 2002/0166202 A1 Nov. 14, 2002

(51) Int. Cl.⁷ .................................................. B60B 33/06
(52) U.S. Cl. ................................................ 16/34; 16/19
(58) Field of Search ............................... 16/34, 19, 32, 16/35 R; 190/18 A, 39; 280/37, 43.1, 43.17

(56) References Cited

U.S. PATENT DOCUMENTS

| | | |
|---|---|---|
| 1,058,837 A | 4/1913 | Zikmund |
| 1,130,684 A | 3/1915 | Brown |
| 2,663,048 A | 12/1953 | Ross, Jr. et al. ............. 16/34 |
| 2,926,021 A | 2/1960 | Altadonna ................. 280/11 |
| 4,026,569 A * | 5/1977 | Staal ............................ 16/34 |
| 4,139,208 A | 2/1979 | Kaley et al. ................ 280/9 |
| 4,240,646 A | 12/1980 | Scott ............................ 280/30 |
| 4,249,282 A * | 2/1981 | Little ............................ 16/32 |
| 4,397,062 A * | 8/1983 | Huang ........................ 16/33 |
| 4,417,738 A * | 11/1983 | Kendall ....................... 16/34 |
| 4,588,203 A * | 5/1986 | Anderson .................. 16/34 |
| 4,783,879 A | 11/1988 | Weaver ...................... 16/34 |
| 4,845,804 A | 7/1989 | Garrett ....................... 16/19 |
| 5,347,680 A | 9/1994 | Rippe ......................... 16/19 |
| 5,365,635 A * | 11/1994 | Jang ........................... 16/34 |
| 5,375,294 A | 12/1994 | Garrett ....................... 16/34 |
| 5,575,036 A * | 11/1996 | May ............................ 16/32 |
| 5,806,863 A | 9/1998 | Heger et al. ........... 280/33.998 |

FOREIGN PATENT DOCUMENTS

EP          0047210       * 8/1981

* cited by examiner

Primary Examiner—Chuck Y. Mah
(74) Attorney, Agent, or Firm—Guy V. Manning

(57) ABSTRACT

A retractable caster system comprises a rectangular, steel box defining a chamber, a plurality of which may be attached to the bottom of a storage container to elevate the container above a surface upon which it rests. Inside the chamber, a caster is mounted to a hinged plate which pivots near the bottom of one sidewall of the chamber. The plate articulates between a substantially vertical position, with the caster fully retracted into the chamber, and a horizontal position with the caster wheel protruding beneath the chamber. A coiled spring biases the plate toward a vertical position, and an automatic locking mechanism holds the caster in its extended position. The caster may be raised and lowered without separately supporting the weight of the container.

21 Claims, 3 Drawing Sheets

RETRACTABLE CASTER

BACKGROUND OF THE INVENTION

1. Field of the Invention

This invention relates to casters generally and particularly to a retractable caster which may be lowered to mobilize a storage container and then retracted for stacking or immobilizing the container. Still more particularly, this invention relates to a retractable caster having its own chamber beneath the container into which the caster retracts, and which spaces apart containers for fork lift insertion.

2. Description of Related Art

Casters permanently attached to large storage containers permit easy movement of the containers across load bearing surfaces. When such containers are stacked on top of one another, however, the convenience of the caster can be a hazard unless the casters are immobilized. Likewise, it is desirable sometimes to move a container into place on a floor and then prevent it from easily being moved from the selected spot. Convenient means for preventing castered containers from rolling about uncontrolled is highly desirable.

Casters on stacked containers also can be damaged by fork lifts. Fork lift tines can be inserted between casters to lift a container, but accuracy by fork lift drivers is more ideal than reality. The forks smash into unprotected casters, damaging them and preventing them from serving their intended purpose. A need exists for means to protect casters on stacked containers from damage by fork lifts.

Various means have been developed in response to the foregoing needs. Most casters include built-in locks which frictionally hamper rotation of the caster's axle or wheel when rolling is undesirable. Such locks may become contaminated or wear out with usage, however, and release on their own. Locks also do nothing to protect casters from fork lifts.

Known retractable caster systems allow containers to be stacked safely, but do not provide spacing between stacked containers. Such casters typically retract into a recess within the container itself, allowing the containers to be stacked one on top of another. Such arrangements consume container space, however, making the container less efficient. They also do not vertically space apart stacked containers so fork lift tines may be inserted beneath each container. If spacing is necessary, pallets or other devices must be employed to create the separation between containers. A caster retractable into an external chamber on the container bottom would permit safe fork lift insertion and prevent stacked containers from rolling about on top of each other.

Among known retractable casters systems, most require that the weight of the container be relieved while lowering or retracting the caster. This usually involves lifting the container with a fork lift or jacks while someone operates the caster mechanism. The container then may be set down onto its bottom or the caster. A retractable caster operable under load would save time and labor.

SUMMARY OF THE INVENTION

Accordingly, it is an object of this invention to provide a retractable caster which is protected from damage from fork lifts.

It is another object of this invention to provide a retractable caster with its own retraction chamber, said chamber doubling as a spacer between stacked containers.

It is another object of this invention to provide a retractable caster that does not consume container space.

It is yet another object of this invention to provide a retractable caster that eliminates the need for pallets between storage containers.

It is yet another object of this invention to provide a retractable caster system which may be operated under load.

The foregoing and other objects of this invention are achieved by providing a retractable caster system composed of a rectangular steel box defining a chamber, a plurality of which may be attached to the bottom of a storage container to elevate the container above a surface upon which it rests. Inside the chamber, a caster is mounted to a hinged plate which pivots near the bottom of one sidewall of the chamber. The plate articulates between a substantially vertical position, with the caster fully retracted into the chamber, and a horizontal position with the caster wheel protruding beneath the chamber. A coiled spring biases the plate toward a vertical position, and an automatic locking mechanism holds the caster in its extended position. The caster may be raised and lowered without separately supporting the weight of the container.

BRIEF DESCRIPTION OF THE DRAWINGS

The novel features believed characteristic of the present invention are set forth in the appended claims. The invention itself, however, as well as a preferred mode of use and further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
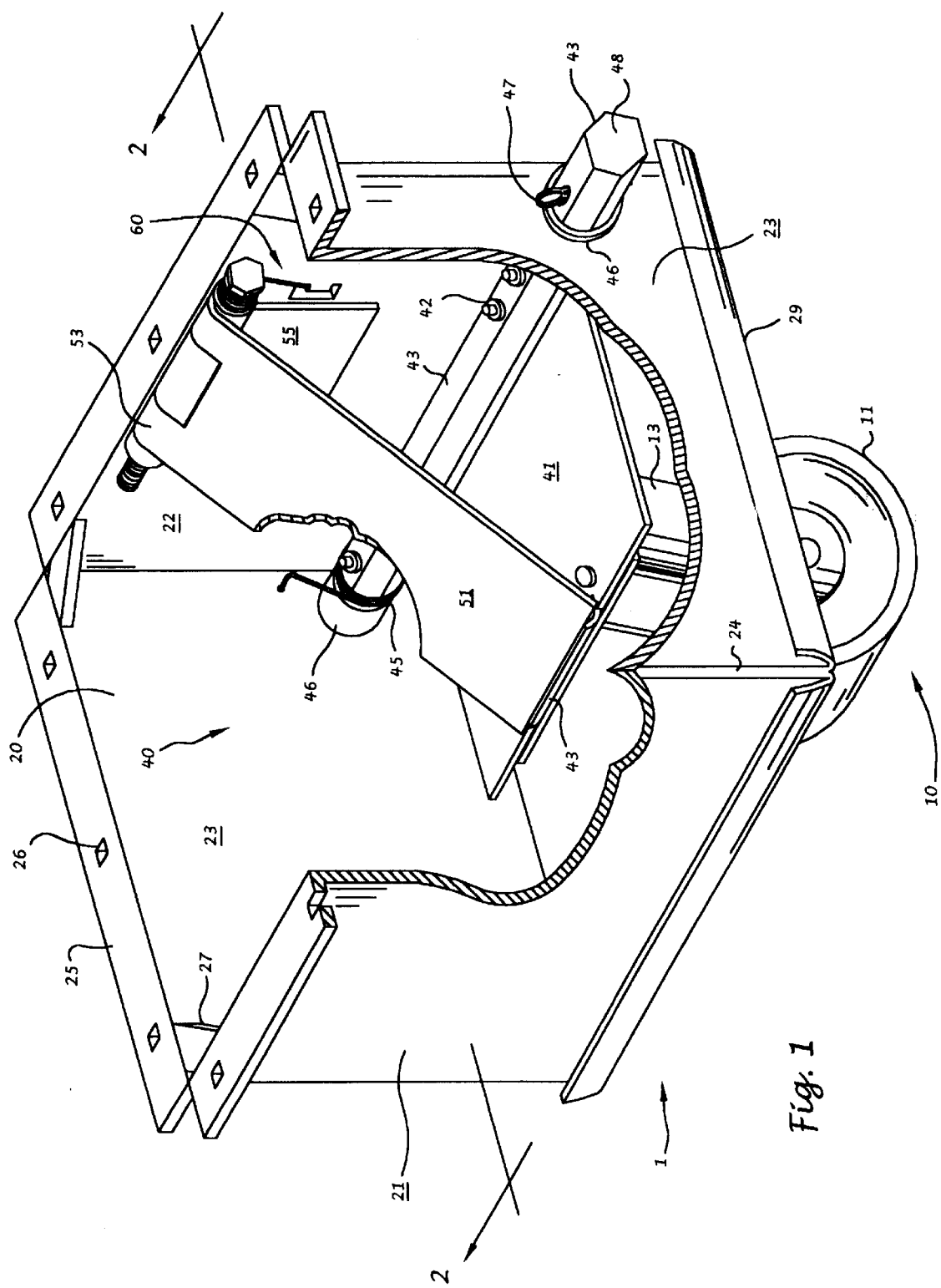
FIG. 1 depicts in perspective the retractable caster of the present invention, portions of the interior thereof being visible through cutaway.
Figure 2:
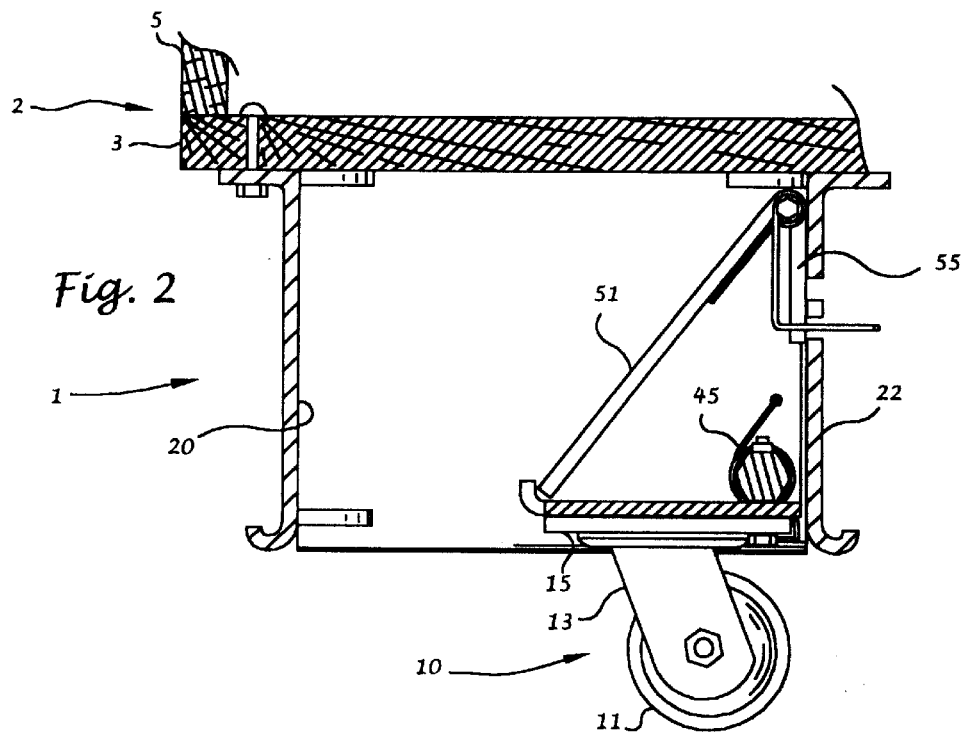
FIG. 2 is a cross section of the retractable caster as indicated in FIG. 1.
Figure 3:
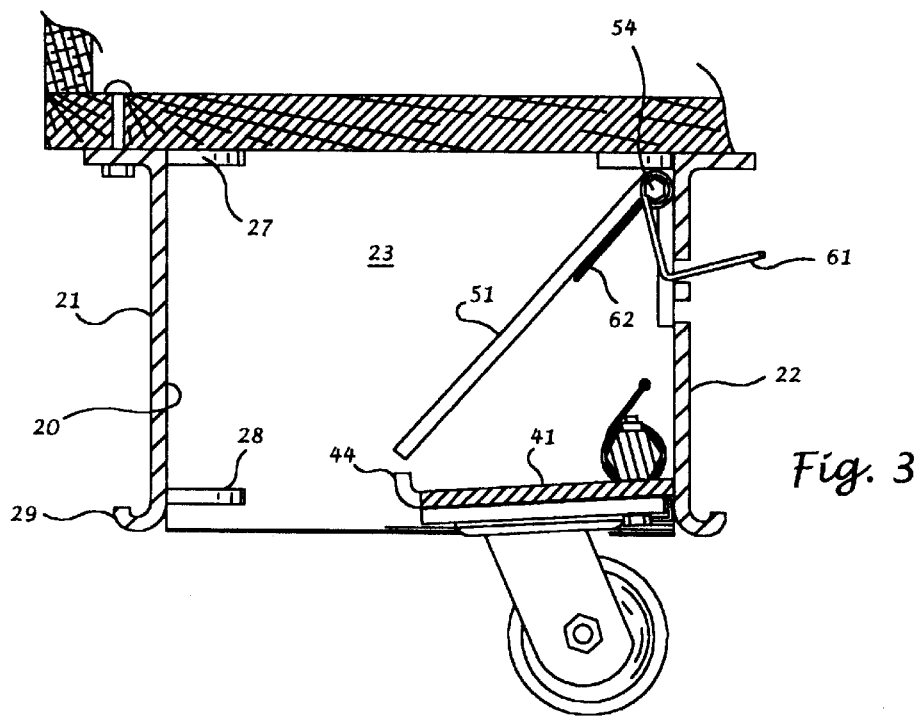
FIG. 3 shows in cross section as in FIG. 2 the retractable caster being lowered.
Figure 4:
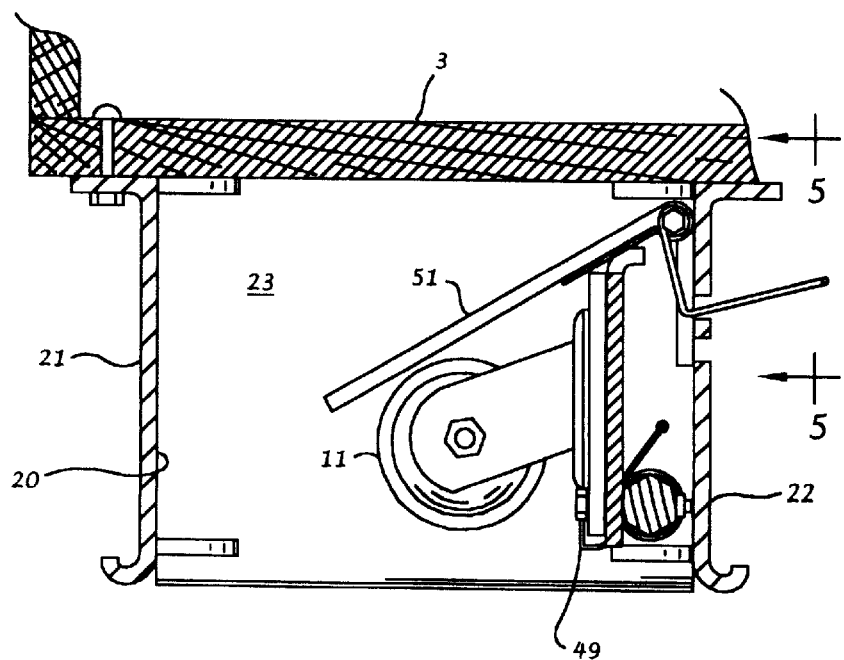
FIG. 4 shows in cross section as in FIGS. 2 and 3 the retractable caster in fully retracted position.

With reference now to the figures, and in particular to FIGS. 1 and 2, caster system 1 comprises chamber 20 containing caster 10 mounted to retraction mechanism 40. Caster 10 consists of wheel 11 mounted by forks 13 to base 15. Base 15 may be swivel or fixed, but in either case is mounted to articulating plate 41 using bolts or other suitable means. Caster 10 thereby articulates into and out of chamber 20 with plate 41 (FIGS. 2–4).

Chamber 20 comprises a rectangular cylinder open at its top and bottom ends. It includes side walls 23 perpendicular to both front wall 21 and opposite, parallel rear wall 22. Disposed horizontally along the outside, upper perimeters of walls 21–23, flanges 25 are adapted for flush mounting chamber 20 on the bottom 3 of container 2. Flanges 25 are punctured along their lengths by a plurality of bolt holes 26 for this purpose. One having ordinary skill in the art will recognize that any conventional means of attaching chamber 20 to container 2 is considered within the spirit and scope of this invention.

Disposed between adjacent walls at or near flange 25, gussets 27 provide strength bracing between adjacent chamber 20 walls. Similar gussets 28 brace adjacent walls near bottom flange 29. Rather than being flat like mounting flange 25, bottom flange 29 curls upwardly as it extends outward from the outside of walls 21–23 to discourage snagging on floors and other containers. Preferably, a plurality of chambers 20 will be disposed around the perimeter of container 2, as needed for support, with rear walls 22 juxtaposed to the outside edge thereof. This orientation enables easy access to shaft 43 from each side of container 2, as further discussed below.

Spanning between side walls 23 near rear wall 22 and bottom flange 29, shaft 43 comprises a hexagonal, steel bar rotatable inside bushings 46. Pins 47 fix shaft 43 in position such that approximately an inch thereof extends through walls 23 to the outside of chamber 20. Shaft 43 thus may be rotated from outside chamber 20 using an open end or box end wrench (not shown) of appropriate size. Coiled spring 45 anchors into side wall 23 and biases shaft 43 in a clockwise direction as viewed in FIG. 2. Bolts 42 affix articulating plate 41 to shaft 43. Rotating shaft 43 thus causes plate 41, bearing caster 10, to articulate between a substantially vertical, retracted position (FIG. 4) and a substantially horizontal, extended position (FIG. 2).

For caster 10 to remain in its extended position (FIG. 2), it must be latched into place against the bias pressure of spring 45 and the weight of container 2. For this purpose, hasp 51 mounts by plate 55 to rear wall 22 just below flange 25 and pivots about hinge 53. When caster 10 is extended to its horizontal position, hasp 51 mates with lip 44 on the distal edge of articulating plate 41 opposite shaft 43. Biasing pressure from spring 45 causes lip 44 to bear against the end of hasp 51, preventing further rotation of plate 44. To retract caster 10, lever 60 biases hasp 51 above lip 44 as discussed below, allowing articulating plate 41 to swing beneath hasp 51 when being raised.

Figure 5:
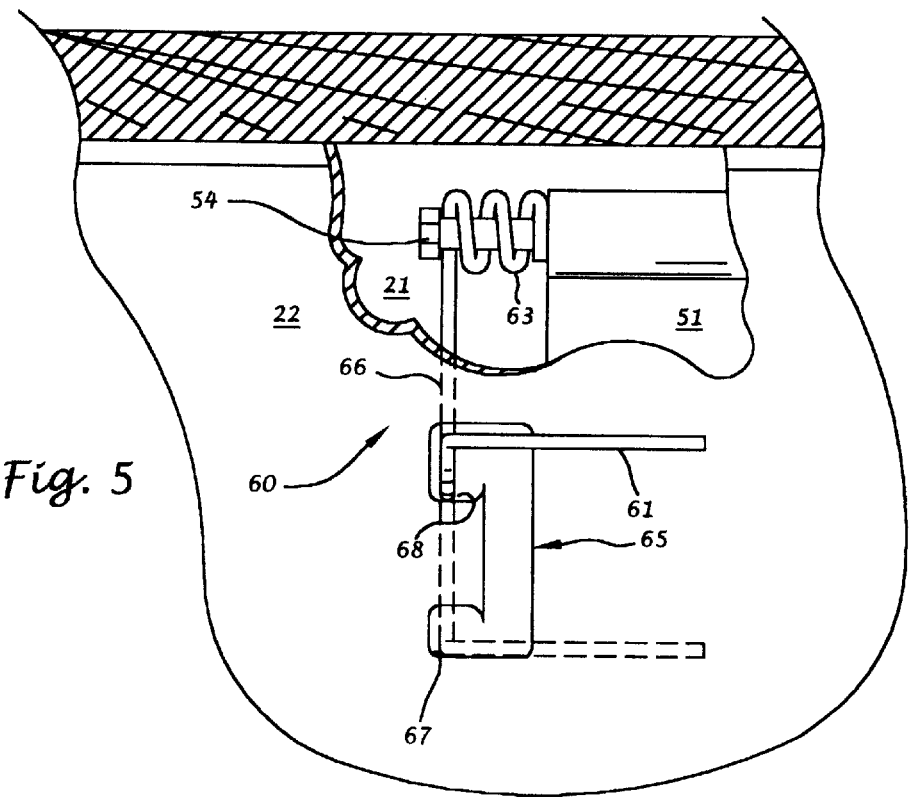
FIG. 5 is a partial view of the rear sidewall of the retractable caster detailing the bar lift mechanism of the preferred embodiment.

Lever means 60 comprises spring 63 coiled about hinge bolt 54, lifting finger 62 extending beneath and bearing against the bottom surface of hasp 51, arm 66 extending downward from spring 63, and L-shaped handle 61 extending rearward from arm 66 through slot 65 in rear wall 22. As shown in FIG. 5, handle 61 may rest in one of two positions defined by notches 67, 68 in one side of slot 65. In its lower position (FIG. 2) in notch 67, handle 61 twists spring 63 in a clockwise direction (as viewed in FIG. 2) such that lifting finger 62 bears against hasp 51 to lift it above lip 44 (FIG. 3). This permits plate 41 to bypass hasp 51 as it moves toward its vertical position (FIG. 4). In its upper position (FIG. 4) in notch 68, handle 61 relieves the tension in spring 63, withdrawing finger 62 enough to allow hasp 51 to rotate downwardly and engage lip 44 on plate 41. When plate 41 moves to its horizontal position, hasp 51 drops into place to engage lip 44, thereby latching caster 10 into its extended position.

Chamber 20 preferably is formed from rectangular steel plates for cylinder walls 21–23, the plates being welded at seam(s) 24 where necessary to form a rectangular cylinder defining chamber 20. One having ordinary skill in the art will recognize that walls 21–23 may be fabricated from a single plate, bent into right angles at selected distances along its length to create walls 21–23. Preferably, and for most applications, chamber 20 walls 21–23, gussets 27, 28 and articulating plate 41 comprise 0.164 inch, cold rolled, steel plate, generally available. One having ordinary skill in the art will recognize that other materials may be appropriate in specific applications, including high impact resistant plastics, wood and the like. Preferably, shaft 43 comprises Grade 1018 or better steel bar, seven eighths (⅞") inch in diameter, generally available. A suitable bushing 46 is a one (1") inch, flanged, sintered bronze bushing impregnated with oil, generally available and known as "oilite." Suitable coil springs 45 and 63 are normalized, piano wire having diameters of 0.155 inch and 0.125 inch, respectively, and generally available.

In operation, retractable caster system 1 may begin with casters 10 extended as in FIGS. 1 and 2 to permit container 2 to be rolled about on a surface (not shown). The operator rolls container 2 to a location from which he desires that it not be easily movable. Once container 2 is positioned, the operator lowers casters 10 one at a time. The following discussion first details how an individual caster 10 is lowered and retracted, then discusses a preferred procedure for operating a plurality of such caster systems 1 to raise and lower container 2.

To retract caster 10 into chamber 20, the operator first makes sure handle 61 occupies its lower position in notch 67, as shown in FIG. 2. He then rotates shaft 43 counterclockwise (as viewed in FIGS. 2–4), thereby pushing caster 10 downward slightly. This rotation need only move plate 41 enough to disengage hasp 51 from lip 44. When this happens, tension in spring 63 causes lifting finger 62 to bias hasp 51 upwardly, as indicated in FIG. 3, so that lip 44 may pass beneath hasp 51. The operator then relaxes pressure on his wrench, allowing shaft 43 to rotate clockwise (as viewed in FIGS. 2–4) under bias from coil spring 45 and possibly some of the load of container 2. The operator continues to rotate shaft 43 until plate 41 occupies its vertical position as shown in FIG. 4, where it will be held by the tension in coil spring 45. Caster 10 then is completely retracted inside chamber 20. At this point, the weight of container 2 may or may not rest on curled lower flange 29, depending upon which of the retractable caster systems 1 under container 2 was being operated. The operator next repeats these steps for all caster systems 1 on the bottom of container 2, as further discussed below, until the weight of container 2 rests on lower flanges 29 of all caster systems 1 under container 2.

Extending, or lowering, casters 10 requires reversing the preceding steps. The operator first moves handle 61 into its upper position in notch 68 (FIG. 4), relieving the tension in spring 63. Next, he rotates shaft 43 counterclockwise (as viewed in FIGS. 2–4) until plate 41 passes through its horizontal position. At that point, hasp 51 drops by its own weight into engagement with lip 44, making a recognizable noise audible to the operator. The operator then relaxes pressure on his wrench, allowing shaft 43 to rotate clockwise until lip 44 engages the end of hasp 51 (FIG. 2). Biasing spring 45 keeps constant, upward pressure on plate 41, locking caster 10 into place. The operator repeats these steps for all caster systems 1 beneath container 2 until its weight is borne entirely by casters 10.

For retracting all casters 10 beneath container 2, the operator first selects a first side of container 2 and a second side opposite thereof For safety, the operator may either chock or lock one or more casters 10 on the first side so container 2 will not roll on wheels 11. Next, he retracts any casters 10 on intermediate sides, leaving container 2 supported on casters 10 on the first and second sides. Next, the operator proceeds to the second side and retracts casters 10 along that second side one at a time. Preferably, he works inward from the corners, keeping the load of container 2 as balanced as possible on the inner caster systems 1 on the second side. When he retracts the last such caster 10, he simultaneously lowers container 2 until its weight rests on curled flanges 29 of rear walls 22 of each chamber 20 along the second side. Next, the operator proceeds to the first side of container 2, where casters 10 remain extended. He then lowers casters 10 on that first side. Since the first side of container 2 already rests on the bearing surface, the operator safely may retract casters 10 on the first side in any order. He does so until the entire weight of container 2 rests on all four lower flanges 29 of all chambers 20 around the perimeter of container 2. Container 2 now is immobilized, though still spaced above the bearing surface by the height of chambers 20. If desired, the operator then may move container 2 by inserting fork lift tines between chambers 20 on a given side and lifting. Chambers 20 protect casters 10 from any damage from such fork lift tines.

To re-mobilize container 2 on extended casters 10, the operator first selects a first side of container 2 and a second side opposite thereof. He then extends casters 10 one at a time along the first side, in any order. In anticipation that container 2 will be free to roll once it is supported entirely on casters 10, the operator may lock or chock one or more of casters 10 on the first side. After extending casters 10 on the first side, the operator then moves to the second side and extends casters 10 thereon. Preferably beginning at or near the center of that second side, the operator extends each caster 10 until all casters 10 on the second side are extended. Finally, he extends any casters 10 on intermediate sides of container 2. Container 2 then is free to roll once any chocked or locked casters 10 on the first side are released.

Extending and retracting some of casters 10 as discussed above requires that a portion of the weight of container 2 be lifted and lowered simultaneously. This occurs, for example, where the first caster 10 of the second side is extended, as discussed above. If the operator performs these tasks in the orderly fashion described, however, he will require no assistance. The mechanical advantage gained through shaft 43 and wheel 11 multiplies the leverage in the operator's wrench for the small angular displacement of shaft 43 necessary to cause hasp 51 to engage lip 44. Likewise, when lowering a side using the last caster 10 on the second side, the same mechanical advantage gives the operator sufficient control first to lift container 2 slightly to disengage hasp 51 and then to lower caster 10 while avoiding precariously dropping the second side load.

Retractable caster system 1 provides chambers 20 into which casters 10 may be retracted without consuming space inside container 2. Further, chambers 20 space apart container 2 above its bearing surface, allowing fork lift tines to be inserted below container 2 for lifting. Chambers 20 protect retracted casters 10 from damage during this operation. The operator may stack containers 2 one atop another without fear that upper containers 2 will roll off because caster locks failed. When the operator desires that container 2 be allowed to roll about on its bearing surface, casters 10 may be extended as described above by a single operator without any need to lift container 2 first. Likewise, when the operator desires again to immobilize container 2, he may do so without assistance following the procedures described.

While the invention has been particularly shown and described with reference to a preferred embodiment, it will be understood by those skilled in the art that various changes in form and detail may be made therein without departing from the spirit and scope of the invention. For example, operating lever 60 could be replaced with other means of lifting hasp 51, such as a spring-loaded cylinder (not shown) with two positions, one extended into chamber 20 to lift hasp 51, and the other position extracted to permit hasp 51 to drop as described.

In another example, systems 1 may be provided for a variety of container sizes and weights, with appropriate selections of material strengths and diameters of wheels 11. If containers 2 become large and heavy enough, however, other means may be required to rotate shaft 43 than a simple wrench. For example, mechanical advantage could be provided externally, such as through pneumatic wrenches, to rotate shaft 43. Further, chambers 20 could be equipped with hydraulic pistons or gears (not shown) which multiply the mechanical advantage of a wrench coupled to shaft 43 from a remote operating shaft through a gear train (not shown). Finally, it is considered within the scope of this invention that motorized rotation means, such as a small electric motor mounted within chamber 20 and geared to shaft 43, could be provided.

We claim:

1. A retractable caster system comprising a cylinder having a plurality of vertical walls defining an interior chamber;

a carriage pivotally coupled inside the chamber to a first wall thereof and adapted to be articulated between a vertical position adjacent said first wall and a horizontal position substantially at right angles to said first wall;

caster means mounted to the carriage;

latch means within said chamber for removably latching the carriage in said horizontal position; and external articulating means for pivotally articulating said carriage from outside said chamber.

2. The retractable caster system of claim 1 and further comprising biasing means for biasing the carriage toward said vertical position.

3. The retractable caster system of claim 2 wherein the biasing means comprises a coil spring coupled between said carriage and a chamber wall.

4. The retractable caster system of claim 1 wherein the latch means comprises a rigid member pivotally mounted to the first wall above the carriage and adapted to engage a lip on the carriage distal the first wall.

5. The retractable caster system of claim 1 wherein the external articulating means comprises a shaft coupled between the carriage and the first wall; and rotation means adapted to couple to the shaft for rotating the shaft to articulate the carriage.

6. The retractable caster system of claim 1 wherein the latch means comprises an arm pivotally coupled to said first wall of said chamber and extending therefrom for engaging a lip on said carriage; and lever means for articulating said arm between a first position where said arm engages said lip and a second position wherein said arm is prevented from engaging said lip.

7. The retractable caster system of claim 6 wherein the lever means comprises a spring coupled to said arm adjacent said first wall;

a handle coupled to said spring and extending through said first wall to the exterior of the chamber; and a finger extending from said spring to beneath said arm and bearing vertically upward against said arm when said handle is in said second position.

8. The retractable caster system of claim 7 wherein
the handle extends through said first wall through a slot therein, said slot having
an upper notch adapted to receive the handle and thereby to retain the arm in said second position;
a lower notch adapted to receive the handle and thereby to retain the arm in said first position; and
a channel communicating between said upper notch and said lower notch.

9. A retractable caster system comprising
a rectangular cylinder having a plurality of vertical walls defining an interior chamber;
a carriage bearing a caster and pivotally coupled to the chamber adjacent a first wall thereof, said carriage adapted to articulate between a retracted position substantially parallel said first wall, and an extended, substantially horizontal position wherein said caster extends below said chamber;
a biasing spring coupled between said carriage and a chamber wall and biasing said carriage toward said vertical position;
an operating shaft coupled to the carriage and extending through a chamber wall to the exterior of the chamber and adapted to articulate the carriage between said vertical position and said horizontal position; and
a latch within said chamber having
an arm pivotally coupled to and extending from said first wall of said chamber toward said carriage and adapted alternately to occupy a first position in engagement with a lip on an edge of said carriage distal from said first wall and a second position out of engagement with said lip;
a spring coupled to said arm adjacent said first wall;
a handle coupled to said spring and extending through a slot in said first wall and adapted to rest in a first state corresponding to said first position of said arm and a second state corresponding to said second position of said arm; and
a finger extending from said spring to beneath said arm and bearing vertically upward against said arm when said handle is in said second state.

10. A system for temporarily mobilizing a storage container, the system comprising
a plurality of vertical cylinders disposed along a bottom perimeter of the container, each cylinder having
a plurality of vertical walls having an upper terminus coupled to the bottom of the container and a lower rim opposite the upper terminus and forming an interior chamber;
a rotatable shaft extending between two of said vertical walls adjacent a third of said vertical walls;
a carriage coupled by its proximate end to the shaft inside the chamber and having a distal end;
a latch disposed on said third vertical wall;
a lip disposed on said distal end and adapted to engage the latch;
a caster mounted to the carriage;
lever means for biasing the latch alternately into and out of engagement with the lip; and
rotating means for alternately rotating the shaft to extend the caster out of the chamber beneath the lower rim and to retract the caster into the chamber above the lower rim.

11. The retractable caster system of claim 10 wherein the rotating means comprises
a wrench adapted to couple to the shaft from the exterior of the chamber.

12. A system for protecting casters from damage, the system comprising
a plurality of vertical cylinders disposed along a bottom perimeter of a storage container, each cylinder having
a plurality of vertical walls coupled to the bottom of the container and forming an interior chamber having a lower rim;
a carriage coupled to one of said vertical walls by its proximate end and having a distal end;
a caster mounted to a lower surface of the carriage;
latch means for latching the carriage alternately into a horizontal position wherein the caster is extended beneath the lower rim and a vertical position juxtaposed the one of said vertical walls wherein the caster is contained wholly within the chamber;
operating means for articulating the carriage between said horizontal position and said vertical position.

13. The system of claim 12 wherein the operating means comprises
a rotatable shaft coupled to the proximate end of the carriage; and
rotation means adapted to couple to said shaft for rotating the shaft to articulate said carriage.

14. The system of claim 12 wherein the latch means comprises
an arm pivotally coupled to said one of said vertical walls and extending to engage a lip on said carriage;
a spring coupled to said arm adjacent said vertical wall;
a handle coupled to said spring and extending through said vertical wall to exterior the chamber and adapted to articulate between a first latched position corresponding to the horizontal position and a second unlatched position corresponding the the vertical position; and
a finger extending from said spring to beneath said arm and bearing vertically upward against said arm when said handle is in said first latched position.

15. A method for temporarily immobilizing a storage container, the method comprising
providing a plurality of retractable caster systems coupled to a bottom of said container, each retractable caster system having
a chamber open at its bottom and having a plurality of vertical walls;
a carriage pivotally coupled to a first wall inside said chamber;
a caster mounted to the carriage;
operating means external said chamber for moving said carriage between a first position vertically disposed adjacent said first wall, wherein the caster is retracted within said chamber, and a second, substantially horizontal position, wherein said caster protrudes beneath said chamber; and
latch means within said chamber for removably latching the carriage into said second, horizontal position; then
selecting a first side of said storage container and an opposite second side thereof; then executing in order the following steps:
a. retracting the casters of any retractable caster systems disposed along sides of said storage container other than said first and second sides;
b. retracting the casters of each of said retractable caster systems on said second side until said storage container tilts toward said second side and rests on at least one of said chamber walls of the caster systems on said second side; and c. retracting the casters of each of said retractable caster systems on said first side until said storage container no longer tilts toward said second side and instead rests also on the chamber walls of said retractable caster systems arrayed along said first side.

16. The method of claim 15 and further comprising the step of locking at least one of the caster systems on said first side to prevent it from rolling before executing step b.

17. The method of claim 15 wherein the step of retracting the casters further comprises the additional steps of a. operating the operating means in a first rotational direction to relieve any weight from the container on the latch means; then b. operating the latch means to release the carriage from its second, substantially horizontal position; then c. operating the operating means in a second rotational direction opposite the first rotational direction to reposition the carriage into its first position.

18. The method of claim 15 and further comprising the steps of remobilizing the container by reversing the steps a, b and c by extending the casters in turn instead of retracting them.

19. The method of claim 18 and further comprising the step of locking at least one of the caster systems on said first side to prevent it from rolling before executing step b.

20. The method of claim 18 wherein the step of extending the casters further comprises the additional steps of a. operating the latch means to prepare it for latching the carriage into its second, substantially horizontal position; then b. operating the operating means in a first rotational direction to reposition the carriage from its first position to beyond its second, substantially horizontal position until an audible noise indicates the latch means has engaged; then c. operating the operating means in a second rotational direction opposite the first rotational direction to reposition the carriage into its second, substantially horizontal position.

21. A retractable caster system comprising a cylinder having a plurality of vertical walls defining an interior chamber, said chamber being open at its top and bottom ends;

a carriage pivotally coupled inside the chamber to a first wall thereof and adapted to articulate between a vertical position substantially parallel said first wall and a horizontal position substantially at right angles to said vertical position;

caster means mounted to the carriage;

an arm pivotally coupled to said first wall of said chamber and extending therefrom for engaging a lip on said carriage; and lever means for articulating said arm between a first position where said arm engages said lip and a second position wherein said arm is prevented from engaging said lip.

* * * * *